March 6, 1928.  
A. KUSPER  
1,661,373  
TIRE  
Filed Feb. 2, 1927

INVENTOR  
Albert Kusper  
BY  
ATTORNEY

Patented Mar. 6, 1928.

1,661,373

UNITED STATES PATENT OFFICE.

ALBERT KUSPER, OF DAYTON, OHIO, ASSIGNOR OF ONE-HALF TO WALTER STEFANOWSKI.

TIRE.

Application filed February 2, 1927. Serial No. 165,385.

This invention relates to a new and useful device in the nature of a puncture proof tire for motor vehicles and the like, of resilient qualities.

The object of the invention is to provide a puncture proof tire of novel construction and arrangement of parts, hereinafter more fully described, claimed and illustrated in the accompanying drawing.

Figure 1:
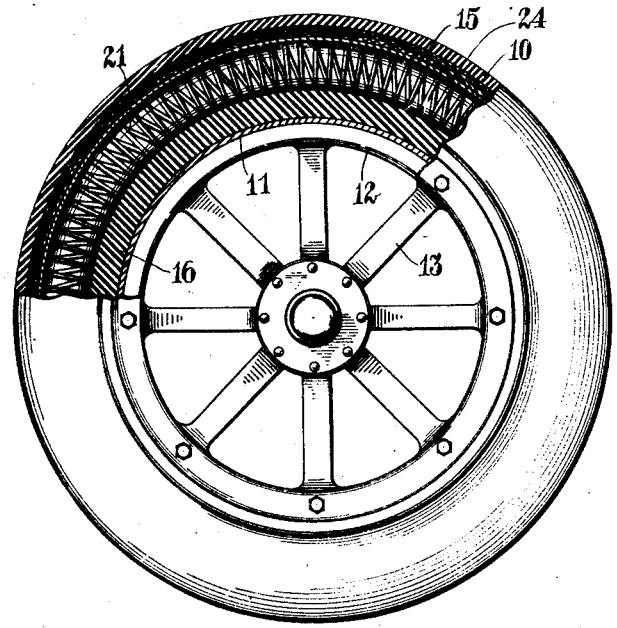
Fig. 1 is a side view partly in central section of my improved puncture proof tire applied to a motor vehicle wheel.

The casing 10, or shoe attached to the rim 11, removably mounted on the felloe band 12, of the motor vehicle wheel 13. The above described elements are those of ordinary construction and design such as generally used on motor vehicles and the like. It is understood that ordinarily, an inner tube, not shown in the accompanying drawing, is inserted in the casing 10, as a means of providing a resilient tire.

As here embodied my improved puncture proof tire comprises, coil springs 20, 21 and 22 positioned inside the inner casing 15, and of suitable length to extend the entire length of the said casing 10. The inner casing 15, is adapted to enclose or cover the inside surface of the casing 10, and is formed or shaped, so as to conform to the shape of the inner portion of the casing 10.

Figure 2:
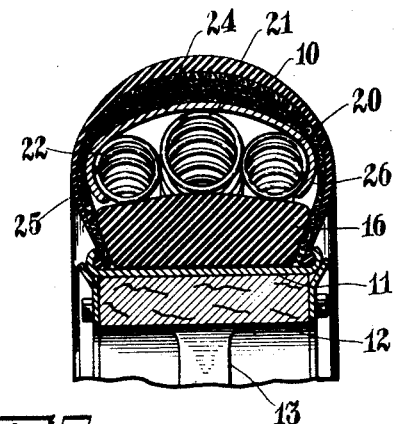
Fig. 2 is a transverse sectional view of the same.
Figure 3:
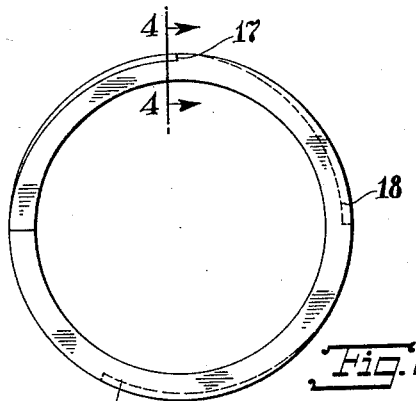
Fig. 3, is a detail front elevational view of the resilient base member as embodied therein.
Figure 4:
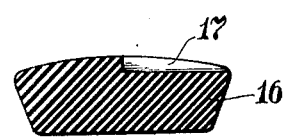
Fig. 4 is a transverse sectional view taken on the line 4—4 of Fig. 3.

In Figs. 2, 3, and 4, of the accompanying drawing, I have shown a resilient member 16, preferably of rubber, positioned in the casing 10 adjacent to, and supported by the above mentioned rim 11. The resilient member 16, is adapted to extend the entire length of the casing 10, and is provided with notched portions 17, 18, and 19, equally spaced on the periphery of the resilient member 16. The notched portions 17, 18 and 19, are adapted to receive one extremity of the coil springs 20, 21, and 22, respectively, as a means of holding the said coil springs 20, 21, and 22 in a fixed position in the casing 10. The coil springs 20 and 22, are positioned in the casing 10, at the sides thereof, the coil spring 21 is positioned intermediate the said coil springs 20 and 22, at the center of the said casing. The guard member 24, comprising resilient material preferably metal is positioned in the casing 10, outwardly of the coil springs 20, 21 and 22. The guard member 24, is provided with side extended elements 25 and 26, formed or bent inwardly therefrom, so as to prevent the guard member 24, from injuring the casing 10. This guard member 24 serves to distribute the force applied to the tire when an irregularity in the road is engaged and also serves to transmit some of the force to the resilient ring 16 by engagement of the sides 25 and 26 with the ring 16.

It is obvious from the foregoing description that I have provided a puncture proof tire of resilient qualities.

Having thus described my invention, what I claim as new and desire to protect by Letters Patent of the United States is as follows:

1. A puncture proof tire for motor vehicles comprising a resilient member positioned in a casing and supported by a rim, the said casing removably attached to the said rim, said resilient member provided with notched portions equally spaced on the periphery of the said resilient member, said notched portions each adapted to receive one extremity of coil springs, as a means of holding the said coil springs in a fixed position in the said casing; a guard member positioned in the said casing outwardly of the said coil springs, said guard member provided with side extended elements formed inwardly therefrom, so as to prevent the said guard member from injuring the said casing.

2. A puncture proof tire for motor vehicles comprising a resilient cushion ring member disposed around the periphery of a vehicle wheel, coil springs mounted on said cushion in adjacent relation, a guard member disposed over said coil springs comprising inwardly formed sides normally terminating outwardly of said cushion, said guard member being adapted to retain said springs in fixed relation and to transmit a portion of the shock received by the tire when the latter engages in an irregularity in the road, and an inner and outer casing disposed over said guard member.

In testimony whereof I have affixed my signature.

ALBERT KUSPER.